（12） United States Patent
Luedde

(10) Patent No.: US 8,312,438 B2
(45) Date of Patent: Nov. 13, 2012

(54) LOW IMPACT DEBUGGING PROTOCOL

(75) Inventor: Mirko Luedde, Hildesheim (DE)

(73) Assignee: SAP AG, Walldorf (DE)

( * ) Notice: Subject to any disclaimer, the term of this patent is extended or adjusted under 35 U.S.C. 154(b) by 1342 days.

(21) Appl. No.: 11/833,060

(22) Filed: Aug. 2, 2007

(65) Prior Publication Data

US 2009/0037892 A1    Feb. 5, 2009

(51) Int. Cl.
*G06F 9/45* (2006.01)
*G06F 9/44* (2006.01)

(52) U.S. Cl. ......... 717/148; 717/125; 717/127; 717/131

(58) Field of Classification Search ........................ None
See application file for complete search history.

(56) References Cited

U.S. PATENT DOCUMENTS

| | | | | |
|---|---|---|---|---|
| 6,031,994 A * | 2/2000 | Radigan | ........................ | 717/152 |
| 6,059,839 A * | 5/2000 | Dehnert et al. | .............. | 717/154 |
| 6,085,035 A * | 7/2000 | Ungar | ........................... | 717/116 |
| 6,113,651 A * | 9/2000 | Sakai et al. | ................... | 717/154 |
| 6,131,189 A * | 10/2000 | Chow et al. | .................... | 717/141 |
| 6,425,124 B1 * | 7/2002 | Tominaga et al. | ............ | 717/146 |
| 6,427,234 B1 * | 7/2002 | Chambers et al. | ............ | 717/140 |
| 6,966,057 B2 * | 11/2005 | Lueh | .............. | 717/158 |
| 6,968,546 B2 * | 11/2005 | Lueh | .............. | 717/158 |
| 7,143,404 B2 * | 11/2006 | Haghighat et al. | ............ | 717/159 |
| 7,185,326 B2 * | 2/2007 | McIntosh et al. | ............. | 717/151 |
| 7,367,023 B2 * | 4/2008 | Adolphson et al. | ........... | 717/153 |
| 7,624,449 B1 * | 11/2009 | Perriot | ............................ | 726/24 |
| 7,698,697 B2 * | 4/2010 | Grcevski et al. | .............. | 717/151 |
| 7,784,042 B1 * | 8/2010 | Lobo et al. | .................... | 717/159 |
| 2003/0018957 A1 * | 1/2003 | Bates et al. | .................... | 717/129 |
| 2004/0193815 A1 * | 9/2004 | Haghighat et al. | ............ | 711/158 |
| 2005/0257202 A1 * | 11/2005 | Kaestner et al. | .............. | 717/153 |
| 2008/0244546 A1 * | 10/2008 | Schmelter et al. | ............ | 717/158 |
| 2009/0106744 A1 * | 4/2009 | Li et al. | .......................... | 717/151 |

OTHER PUBLICATIONS

JVM Tool Interface version 1.0, retrieved online [http://download.oracle.com/javase/1.5.0/docs/guide/jvmti/jvmti.html] published before 2006, pp. 1-228.*
Sun Microsystems, Inc., The Java Hotspot Virtual Machine, http://java.sun.com/products/hotspot, May 2011, pp. 1-18.
JVM Tool Interface, Version 1.0, downloaded on Jun. 7, 2012 http://java.sun.com/j2se/1.5.0/docs/guide/jvmti/jvmti/html, pp. 1-228.
Java Debug Wire Protocol, downloaded on Jun. 7, 2012 http://java.sun.com/j2se/1.5.0/docs/guide/jpda/jdwp.html, 2004, pp. 1-4.

(Continued)

*Primary Examiner* — Tuan Q Dam
*Assistant Examiner* — Zheng Wei
(74) *Attorney, Agent, or Firm* — Mintz Levin Cohn Ferris Glovsky and Popeo, P.C.

(57) ABSTRACT

Methods and apparatus, including computer program products, are provided for debugging using dynamic compilers. The method may include receiving a first indication to grant access to a set of variables and to allow access to be inhibited to a set of remaining variables. The dynamic compiler may be allowed to optimize the set of remaining variables, while the set of granted variables is preserved. A second indication may be provided to acknowledge access to the set of granted variables and allow access to be inhibited to the set of remaining variables. In some variations, the set of granted variables is implemented as a set of live variables and the set of remaining variables is implemented as a set of dead variables. Related apparatus, systems, methods, and articles are also described.

17 Claims, 6 Drawing Sheets

OTHER PUBLICATIONS

Sun Microsystems, Inc., The Java Debugger, downloaded on Jun. 7, 2012, http://web.archive.org/web/20041209160028/http://java.sun.com/j2se/1.5.0/docs/tooldocs/w . . . , 2002, pp. 1-4.

Standard Performance Evaluation Corporation, SPEC JBB2000, downloaded on Jun. 8, 2012, http://www.spec.org/jbb2000, 1995-2012, pp. 1-3.

The Eclipse Foundation, Eclipse—an open development platform, downloaded on Jun. 8, 2012, http://web.archive.org/web/20070420044211/http:/www.eclipse.org, 2007, pp. 1-2.

Standard Performance Evaluation Corporation, SPECjbb2005, downloaded on Jun. 8, 2012, http://www.spec.org/jbb2005/, 1 page.

Eclipse Project Release Notes, Release 3.2.2, last revised Feb. 26, 2007, downloaded on Jun. 8, 2012, http://www.eclipse.org/eclipse/development/readme_eclipse_3.2.2.html, pp. 1-18.

Lindholm Tim et al., "The Java Virtual Machine Specification Second Edition" Second edition, The Java Series, Sun Microsystems, Inc., copyright 1997-1999, pp. 1-473.

Nielson Flemming et al, "Principles of Program Analysis", $1^{st}$ Edition 1999, Corrected $2^{nd}$ printing 2005, Springer, copyright 1999, 2005, pp. 1-452.

* cited by examiner

LOW IMPACT DEBUGGING PROTOCOL

FIELD

The present disclosure generally relates to compilers and, and more particularly, debugging protocols for use with dynamic compilers.

BACKGROUND

A "Java Virtual Machine" (JVM) (also referred to as a "Java Runtime") is a program that can execute other programs ("application programs") provided as Java bytecode. Java bytecode usually, but not exclusively, is generated from programs written in the Java programming language. Java program code may be executed in an interpreted mode, in compiled mode, or using a mixture of the two modes. In addition to governing the execution of an application's bytecodes, the JVM handles related tasks such as managing memory, providing security, and managing multiple threads of program execution. The JVM is a so-called "layer" on top of the operating system of the host (i.e., the physical machine). The JVM thus provides portability of applications across various operating systems and corresponding physical machines (i.e., hardware).

A "dynamic compiler" refers to a compiler built into a virtual machine, such as a JVM. For example, a dynamic compiler may compile procedures of the target program immediately before their first invocation or concurrently with execution. Dynamic compilers may provide accelerated execution of Java bytecode in JVMs. Moreover, a virtual machine with a dynamic compiler may execute a program code in an interpreted mode, in a dynamically compiled mode, or a combination of the two modes. A dynamic compiler may generate optimized code sequences (corresponding to the code sequences of an application) as the application is being executed by an interpreter. The generated code sequence may be stored in cache, and subsequent invocations of the same code sequence prompt an interpreter to query cache for the existence of a compiled version of the same code. If such a compiled version exists, then it is executed, else the incoming code sequence is interpreted by the interpreter. Concurrent with the execution of a procedure, the compiler may compile or recompile a procedure several times to further optimize it. The dynamic compiler is considered "dynamic" since it generates optimized code for applications while these applications are running, and the dynamic compiler may generate new, more optimized code, while the original code is being executed, interpreted, or compiled. In contrast, a "static compiler" completely compiles the program (e.g., into machine specific binary code or into portable bytecode) before it is executed, and compilation and optimization are not performed dynamically as the application is being executed.

To "debug" a program refers to inspection and manipulation of the operations of the program while the program is being executed (e.g., by a virtual machine). This may include setting breakpoints, single stepping, observing the program's variables, changing the program state (e.g., the state of the virtual machine), and registering for events that might occur during execution.

Any compiler, static, or dynamic, needs to know in advance whether it must produce code that can be debugged ("is debuggable") or not. Producing debuggable code restricts the compiler in the amount of optimization that may be applied to the original program. A larger degree of debuggability means a lesser degree of possible optimization, and vice versa. While it may be the case that the performance of a debuggable program need not be optimized (e.g. since debuggability might play a role only during development), enhanced supportability of running server application programs may be needed to balance the achievable performance of the application programs with the desired degree of debuggability.

A "live variable" refers to a local variable that is being used in the current execution path of a program. Specifically, a local variable X is called "live" (or "live out") at some point P in a program, if there is a path in the program from that point P to another point Q, such that the value of the variable X is read at point Q but X does not get written to (i.e., overwritten) on this path; otherwise, the variable X is considered to be a "dead variable" at point P in the program. A dead variable cannot have any impact on the future behavior of the program. The only reason dead variables may have to be maintained in a compiled program (e.g. by saving their values from processor registers to memory) is for extended debugging purposes.

The Java Virtual Machine Tools Interface (JVMTI) is an application programming interface (API) that allows a program, called the "JVMTI client," to inspect the state and to control the execution of application programs running in a JVM, in this context referred to as a "JVMTI server." As such, JVMTI is used to implement debuggers, profilers, and other tools accessing the state of the JVM and the application programs running within the JVM. Since the JVMTI is a native interface of the JVM, a JVMTI client is implemented as a library that is loaded during JVM initialization. When loaded, the JVMTI client may gain access to and manipulate the JVMTI server (i.e., the JVM) via procedure calls (also referred to as "in-process messages"). These procedure calls may be directed from the JVMTI client to the JVMTI server, but may also occur in the other direction.

The Java Debug Wire Protocol (JDWP) is a communication protocol between a JDWP client and a JDWP server that is associated with a JVM. A "protocol" generally refers to allowed exchanges of messages between two communicating parties. The part that initiates the communication is called the "client," while the so-called "server" operates on behalf of the client. In particular, a "debugging protocol" specifies the way a debugger client may communicate with a debug server, such as a JVM. A JDWP client typically includes an interactively used debugger that allows the user to debug a running Java program in the remote JVM associated with the JDWP server. The message exchange between the JDWP client and the JDWP server typically takes place across a network, as opposed to the in-process message exchange in JVMTI. The JDWP server typically is implemented as a JVMTI client hosted by a JVMTI-capable JVM.

SUMMARY

The subject matter disclosed herein provides methods and apparatus, including computer program products, for a debugging protocol for use with a dynamic compiler.

In one aspect, there is provided a computer-implemented method for dynamic compilers. The method may include receiving an indication at the virtual machine, which lets the virtual machine grant access to a set of live variables in subsequent requests of the client (e.g., for debugging purposes). This grant does not imply that the virtual machine also allows access to a set of dead variables. The live variables and dead variables referred to are associated with a program that may undergo compilation by a dynamic compiler. The virtual machine may inhibit access to the set of dead variables based on the received indication to enable the dynamic compiler to compile the program without having to preserve the set of dead variables. The virtual machine may provide an indication acknowledging that the virtual machine grants access to the set of live variables. Otherwise, the virtual machine may provide an error indication that the virtual machine does not provide the grant of access to the set of live variables. For example, if a client receives an acknowledgement, then the client may assume that subsequent accesses to live variables will be successful, but the client may not assume that accesses to dead variables will be successful as well. If the client receives the error indication, then the client must not assume that any access to live variables will be successful.

The subject matter described herein may be implemented to realize the advantage of improved compilation (e.g. dynamic compilation) of programs (e.g. in a virtual machine such as a JVM) by enabling compilation to optimize on dead variables but not on live variables. Compiling to optimize on dead variables but not live variables may maintain a higher degree of debuggability of the generated code when compared to optimizing on all variables. Moreover, compiling to optimize on dead variables but not live variables may maintain a higher degree of possible optimizations than if all variables are required to be preserved by the compiler.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
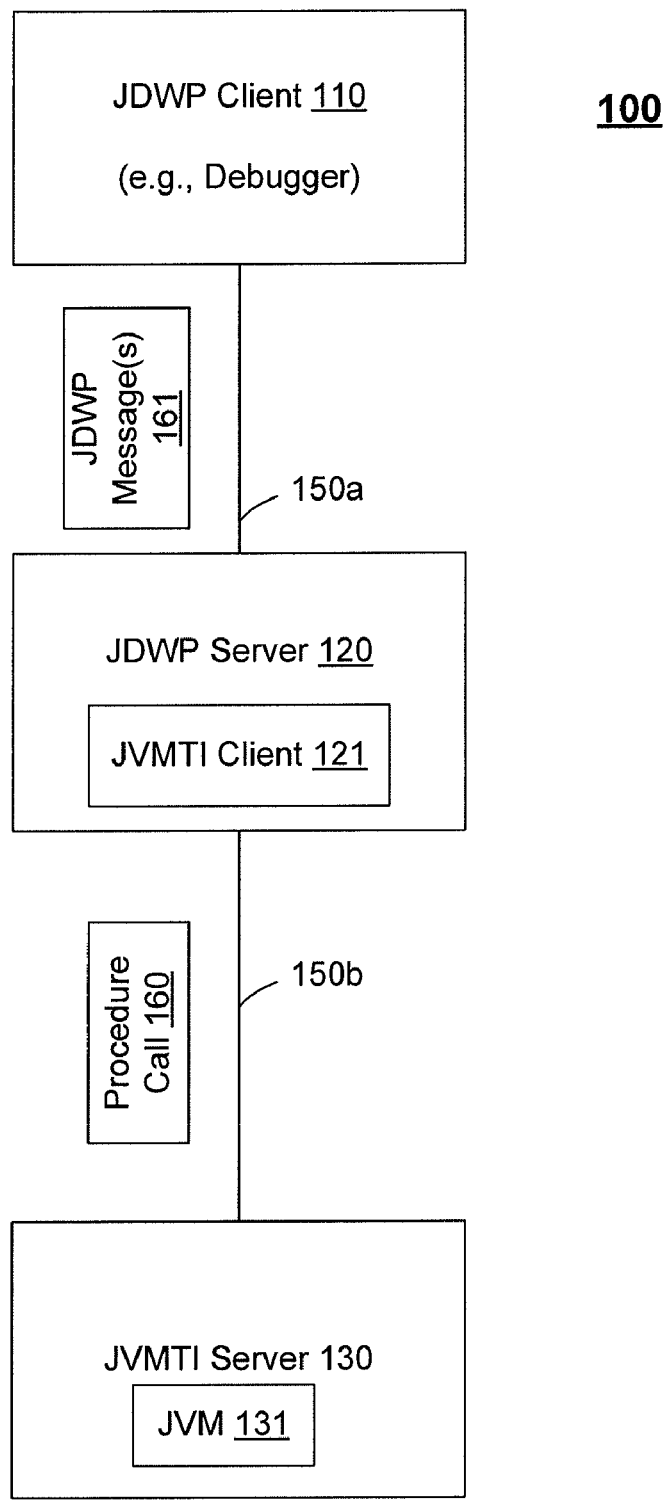
FIG. 1 depicts a block diagram of a system for debugging of programs in a virtual machine (e.g., by JDWP and JVMTI messages exchanged for debugging Java programs in a JVM)

Like labels are used to refer to same or similar items in the drawings.

DETAILED DESCRIPTION

When a program is to be debugged, a compiler is restricted when optimizing the program. For example, a debugger may attempt to access local variables of the program being debugged. As such, the compiler must preserve all variables of the original uncompiled program at any point in the compiled program to enable the debugger to access those variables. The preservation of all variables at any point in the compiled program restricts optimization of the performance of the program. In some instances, preserving all local variables may be unnecessary since many debugging operations may be performed using only the live variables. To that end, the subject matter described herein provides a protocol for debugging that allows a debugging client to control (or inspect) the degree of accessibility of variables, i.e. to control whether access to any variables needs to be granted at all, whether the access may be restricted to live variables, or whether all variables must be kept accessible. In some implementations, the debugging protocol described herein may be implemented as a client-server debugging protocol, such as a protocol incorporated into (e.g., as a modification to, or an extension of the Java Virtual Machine Tool Interface (JVMTI) and the Java Debugger Wire Protocol (JDWP). For example, JVMTI and JDWP may be modified to include the features described herein to enable a debugging client to indicate that debugging needs access to live variables and not dead variables. Therefore, the dynamic compiler (e.g., the compiler of the JVM) has the freedom to optimize without regard to dead variables.

Java is a dynamically compiled language. The subject matter described herein may achieve the greatest benefit in terms of optimization if the program code is dynamically compiled and the compiler supports "deoptimization." Deoptimization refers to dynamic compilers of JVMs capable of deoptimization by interrupting the execution of a running procedure at certain deoptimization points and continuing to run the procedure in interpreted (e.g., unoptimized) mode. Deoptimization enables adaptation of the compiled procedures by deoptimizing and then possibly recompiling in order to adapt to changed conditions during the execution of the program. Supporting deoptimization requires that the JVM reconstruct the unoptimized interpreter state at the deoptimization points. In particular, the values of live variables of the unoptimized program must be known even in the optimized code. As a consequence, granting live variables access to a debugging client does not additionally restrict the achievable optimization. Although a JVM is described, other types of virtual machines may be used as well.

The following refers to implementations incorporated into a JVM and debugging protocols JVMTI and JDWP, although other compilers and debugging protocols may include the features described herein.

FIG. 1 depicts a system 100 including a JDWP client 110, a JDWP server 120 implemented as a JVMTI client 121, and a JVMTI server 130 that is provided by the JVMTI capable JVM 131. Network 150a (e.g., the Internet, an intranet, or any other communication mechanism or link) connects JDWP client 110 and JDWP server 120, while JVMTI client 121 and JVMTI server 130 may be connected by in-process communication 150b.

JDWP client 110 provides an interface for debugging of program code (e.g., running within a JVM 131 at JVMTI server 130). The JDWP client 110 defines the communication protocol (e.g., format) between the debugger (i.e., client debugger 110) and the program being debugged (e.g., executed by JVM 131). Moreover, in some implementations, the JDWP client 110 may also provide information regarding the state of the JVM 131 to debuggers and other systems. For example, JDWP client 110 may provide access to a running JVM's 131 state, class, array, interface, primitive types, and instances of those types. The JDWP client 110 may also provide explicit control over execution of the JVM 131 including suspension and resumption of threads, setting breakpoints, setting watchpoints, setting notification of exceptions, class loading, thread creation, inspection of suspended thread state, inspection of local variables, inspection of stack backtrace, and the like.

JDWP client 110 may send and/or receive one or more messages 161 to/from JDWP server 120 as part of the debugging of the JVM 131. Messages 161 may include command and reply messages. For example, JDWP client 110 may send a command message and receive a reply message from JDWP server 120. A command message (also referred to as a command packet) may be sent by JDWP client 110, JDWP server 120, and JVMTI client 121 to request information from the JVM 131 or to control program execution of the JVM 131. In some cases, command packets are sent by JDWP server 120 to notify JDWP client 110 of some event in the JVM 131 (e.g., a breakpoint or an exception). A reply message may be sent only in response to a command packet and provides information regarding the success or failure of a command. Reply packets may also carry any data requested by a command (e.g., the value of a field or variable).

The JDWP server 120 receives messages (e.g., commands) from JDWP client 110 and includes a JVMTI client 121. The JDWP server 120 including JVMTI client 121 exchanges on one or more procedure call(s) 160 with JVMTI server 130, which is hosted by the JVM 131. The JVM 131 runs the program (which may be compiled) that is being debugged. The procedure calls 160 enable JDWP server 120 to interact with JVMTI server 130 to process the commands and replies associated with JDWP client 110 during debugging of the JVM.

The Java Virtual Machine Tool Interface (JVMTI) is a protocol for in-process communication between a JVMTI client (e.g., JVMTI client 121) and a JVMTI server (e.g., JVMTI server 130). The JVMTI client 121 includes a dynamic library for loading into a JVMTI-capable JVM (e.g., JVM 131). The JVMTI client 121 provides the client-side JVMTI procedures. The JVMTI is a programming interface used by development and monitoring tools to provide both a way to inspect the state and to control the execution of applications running in the JVM 131. Specifically, JVMTI provides a virtual machine interface to access the state of JVM 131 including one or more of the following: profiling, debugging, monitoring, thread analysis, and coverage analysis tools. JVMTI is a so-called "two-way interface" including a client of JVMTI, such as JVMTI client 121, which may be notified of events at JVM 131. JVMTI enables query and control of JVM 131 either in response to events or independent of them. The JVMTI client 121 runs in the same process with and communicate directly with the virtual machine executing the application being examined (e.g., the application in JVM 131). Moreover, the JVMTI client 121 may be the backend that supports remote debugging via JDWP messages 161, while the JVMTI server 130 is a JVM implementation that provides the JVMTI server-side procedures and provides functionality for loading the JVMTI client library 121.

Figure 2A:
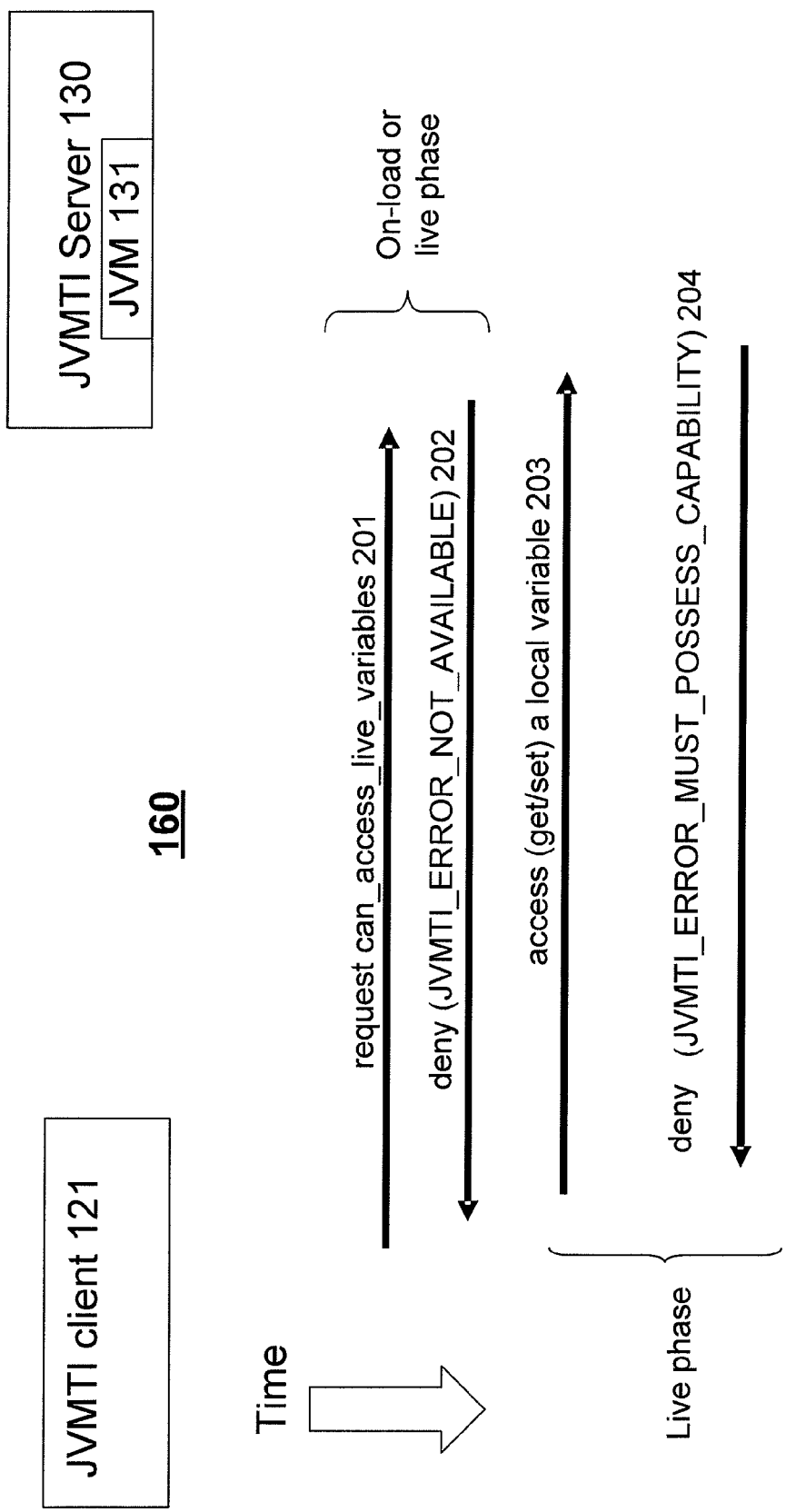
FIGS. 2a, 2b, and 2c depict messages exchanged via JVMTI procedure calls associated live and dead variables.
Figure 2B:
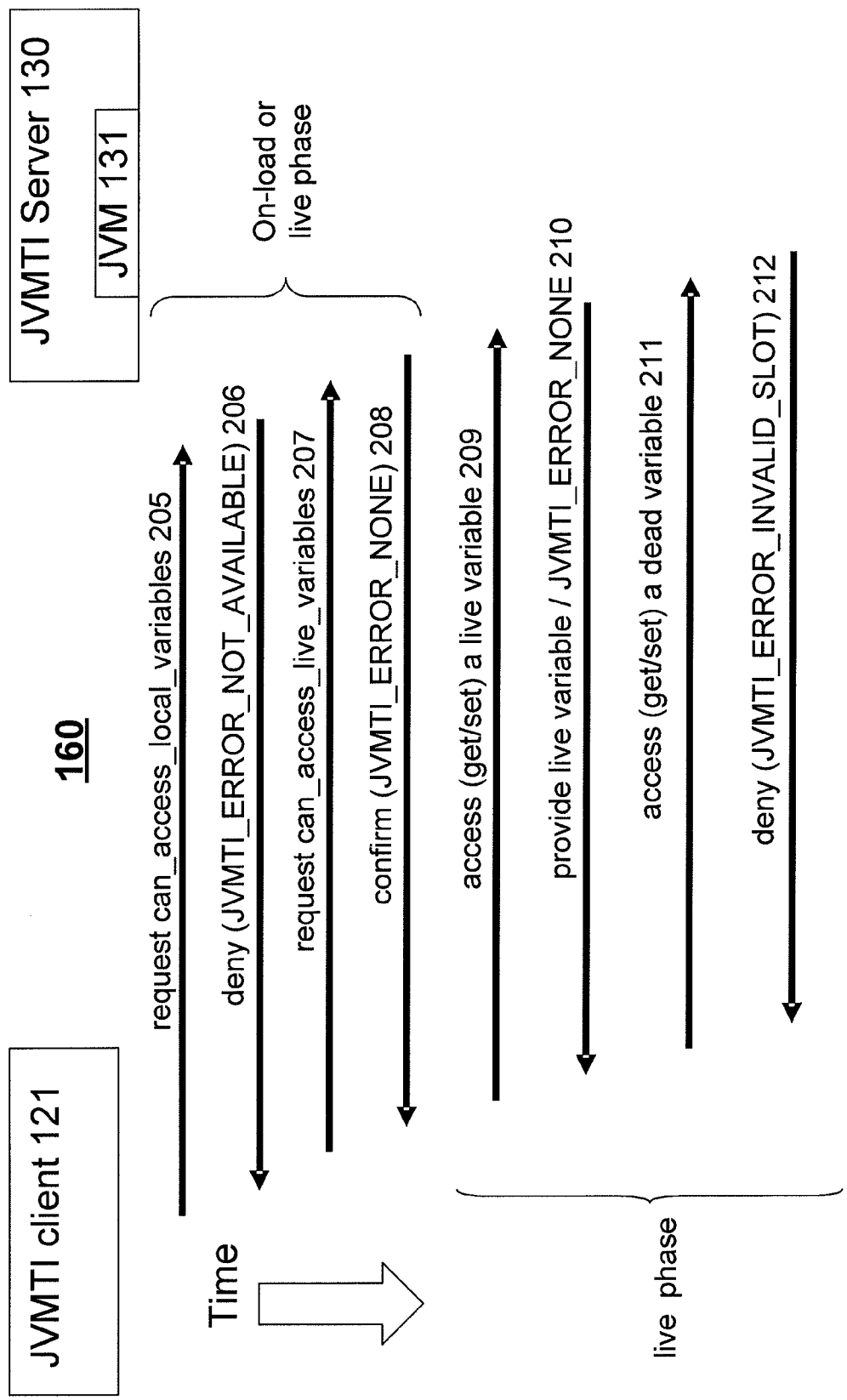
Figure 2C:
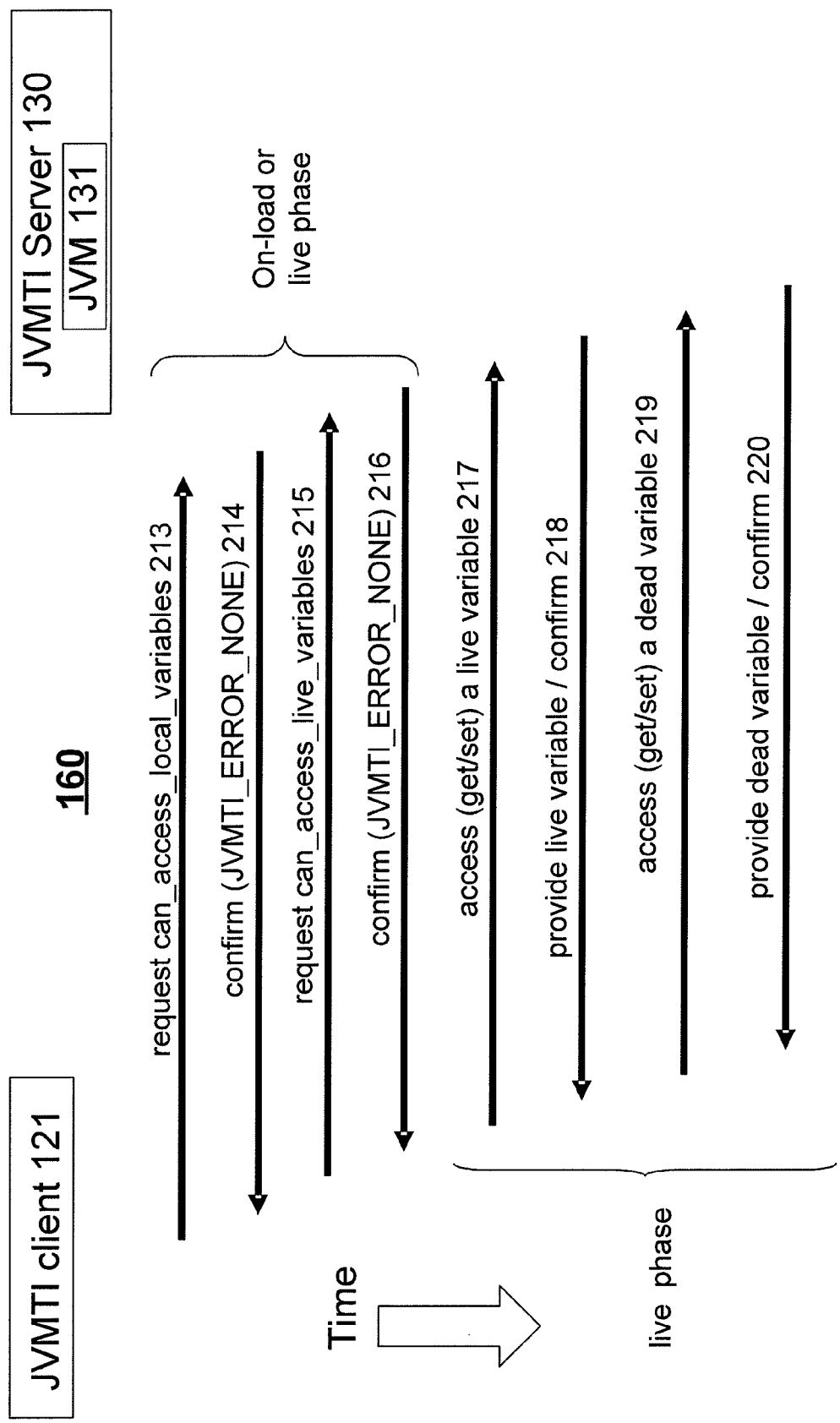

FIGS. 2a-2c depict procedure calls and returns 160 between the JVMTI client 121 and JVMTI server 130 (e.g., to debug a program being executed by JVM 131 and possibly being dynamically compiled). The procedure calls/returns 160 provide, as a feature, negotiations between JVMTI client 121 and JVMTI server 130 regarding the degree of access to local variables. This feature takes advantage of one or more of the following observations: often live variables will be sufficient for debugging while dead variables can be discarded; live variables have to be preserved by dynamic compilers that support deoptimization; dead variables are not needed for deoptimization and can be optimized; and avoiding the need to preserve dead variables in debuggable compiled code opens the opportunity for more compiler optimizations being applied to the program code, as shown in Tables 1-3 below. Table 1 below depicts an example of a Java program that may be debugged, although other types of programs may be debugged as well. Table 2 depicts a machine code representation of preserving dead variables in connection with the program of Table 1, while Table 3 depicts a machine code representation of how dead variables may be removed in connection with the program of Table 1.

```
float diagonal(float a, float b) {
    float x = a*a + b*b;
    // `a', `b' are dead
    float c = sqrt(x);
    // `a', `b', `x' are dead
    return c;
}
```

Table 2 depicts a machine code fragment showing how full debuggability of the procedure "diagonal" of Table 1 has to preserve dead variables.

```
STFD F2,120+0,SP   // save b for debugging
STFD F1,112+0,SP   // save a for debugging
FMUL F13,F1,F1     // t <- a*a
FMUL F12,F2,F2     // u <- b*b
FADD F13,F13,F12   // t <- t+u
STFD F13,136+0,SP  // save t (equals x) for debugging
FMR F1,F13         // x <- t (pass x)
CALL,static 0x0000040002235860 // sqrt(x)
```

Table 3 depicts a machine code fragment showing how optimization of the procedure "diagonal" of Table 1 may remove dead variables.

```
FMUL F13,F1,F1     // t <- a*a
FMUL F12,F2,F2     // u <- b*b
FADD F1,F13,F12    // x <- t+u (pass x)
CALL,static 0x0000040002235860 // sqrt(x)
```

The subject matter described herein thus provides a protocol, which may be used to obtain access to live variables, but not necessarily to dead variables. In some implementations, JVMTI client 121 may use a can_access_live_variables request message to demand access to live variables, but not to dead variables, and JVMTI server 130 will respond with a can_access_live_variables reply message (e.g., a confirmation), as described further below.

In some implementations, negotiating the desired debugging capabilities takes place in the early "on-load" phase since the compiler might need to know the desired features in advance, as depicted for example in FIG. 2a. When JVMTI server 130 does not grant access to local variables and does not grant access to live variables (e.g., in FIG. 2a, the can_access_live_variables request 201 has been denied by message 202 and a can_access_local_variables request has not been granted by JVMTI server 130 or JVM 131), then JVMTI client 121 may nevertheless attempt to access a local variable (including dead variables or live variables) by a message 203. In this case, JVMTI server 130 may reply an error message 204, such as "JVMTI_ERROR_MUST_POSSESS_CAPABILITY."

FIG. 2b depicts that JVMTI client 121 has received an indication (e.g., a confirmation 208 of the JVMTI client's request 207) that all live variables at JVM 131 may be accessed. Moreover, JVMTI client 121 has not received a grant regarding access to all local variables (e.g., the JVMTI client 121 has explicitly obtained a denial message 206 to its can_access_local_variables request 205). When this is the case, JVMTI client 121 may access one or more variables at JVM 131 using, for example, a message 209 or 211 (e.g., from the "GetLocalVariable" or the "SetLocalVariable" families of JVMTI procedures). As such, the variables, if live, will be delivered from JVM 131 to JVMTI client 121. Message 209 thus represents JVMTI client 121 accessing (e.g., requesting) live variables associated with JVM 131, and message 210 is the server's reply including a success indication. Otherwise, if JVMTI 121 attempts to access a dead variable, e.g. by message 211, then a JVMTI error "JVMTI_ERROR_INVALID_SLOT" may be delivered as in message 212, but the request may also be satisfied (this is not depicted in FIG. 2b) at the discretion of the JVM 131 (e.g., the variable requested is dead but it resides in a procedure that is executed by the interpreter instead of being executed as compiled code). Moreover, when JVMTI server 130 (and JVM 131) only grants access to live variables, JVMTI may allow the dynamic compiler of the JVM 131 to optimize away dead variables and only retain live variables. For example, the dynamic compiler of JVM 131 may compile some or all procedures of the application program without regard to dead variables (e.g., the compiler need not produce code that transports the values of dead variables from central processing unit (CPU) registers into memory).

FIG. 2c depicts the case when JVMTI client 121 is given access to all local variables as indicated by the confirmation message 214. In this case, client 121 may also request can_access_live_variables as in message 215. If client 121 does so, the server 130 must provide the requested grant as in message 216 because server 130 has already granted access to all local variables (i.e., live variables and dead variables) using message 214. Later, JVMTI client 121 may access all local variables (e.g. by message 217 and 219) given respective replies 218 and 220. In this case, when JVMTI server 130 grants access to local variables, JVMTI server 130 requires the dynamic compiler of the JVM 131 to maintain both the live variables and the dead variables associated with the application program being debugged. However, in order for the dynamic compiler of the JVM 131 to be able to exploit the features of the subject matter described herein, JVMTI client 121 may not request (e.g., by message 213) and must not be given the can_access_local_variables confirmation message 214 since confirmation message 214 will require the dynamic compiler of the JVM 131 to maintain dead variables as well as live variables—severely limiting optimization by the dynamic compiler. Nor should the JVMTI client 121 request or be given a can_pop_frame confirmation message since this will require that all incoming arguments (which are a subset of the variables) of a method be maintained even after they are dead—also limiting optimization by the dynamic compiler.

Compared to the can_access_local_variables state, being in the can_access_live_variables state allows the dynamic compiler of JVM 131 to enhance optimizations in generated code. The dynamic compiler may eliminate some or all of the dead variables and hence enjoy less register pressure, less spilling code, and more opportunities for dead code removal, all of which contribute to better optimization of the application program executed by JVM 131.

In some implementations, a dynamic compiler of JVM 131 may support deoptimization of dynamically compiled program code. With deoptimization support, the dynamic compiler of the JVM 131 must preserve all of the live variables, so the JVMTI client 121 may request the can_access_live_variables state (e.g., message 207) at any time (e.g., in the on-load and in the live phase of JVM execution) and may be subsequently confirmed (e.g., by message 208).

In some implementations where the compiler of JVM 131 does not support deoptimization, JVM 131 may still offer the can_access_live_variables state during the on-load phase. For example, the JVMTI client 121 may request the can_access_live_variables state at startup (i.e., on-load) of JVM 131. If this is granted by confirmation message 210, the compiler optimization is thus restricted to require the compiler to preserve the live variables, while possibly not preserving the dead variables. Without having confirmed the can_access_live_variables state, the JVM's dynamic compiler can perform a full optimization that does not preserve live or dead variables.

Figure 2D:
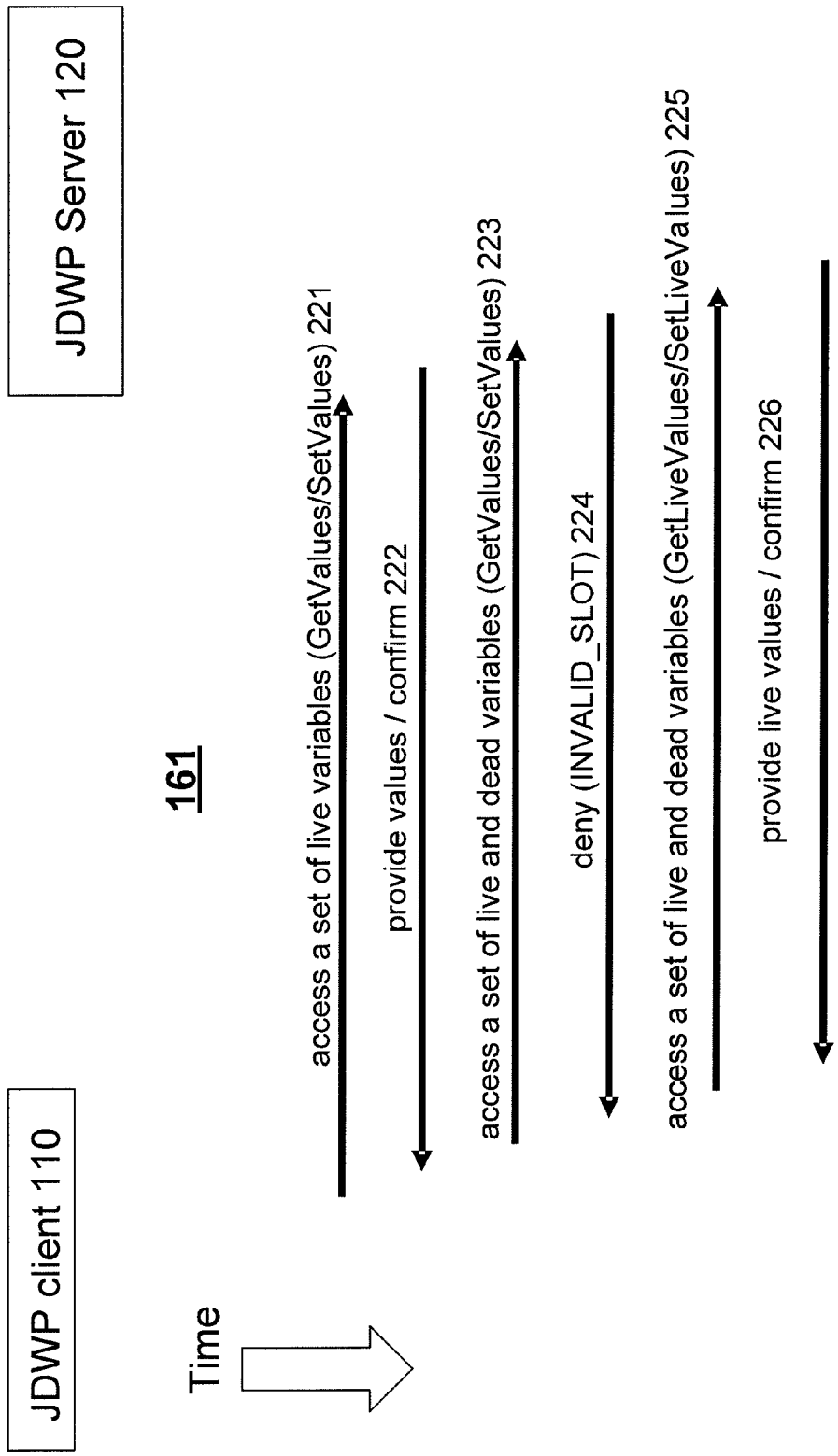
FIG. 2d depicts message exchange via JDWP messages under presence of a grant to access live variables and absence of a grant to access dead variables.

FIG. 2d depicts a message exchange according to JDWP exploiting the features of the subject matter described herein. The message exchanges in JDWP are similar in many respects to those of JVMTI. JDWP does not provide a negotiation of debugging capabilities between the JDWP client and the JDWP server. Instead, JDWP assumes that the JDWP server is configured at startup to provide the desired capabilities (e.g., this configuration may involve negotiations between the underlying JVMTI client 121 and the JVMTI server 130), so a distinction between an on-load and a live phase is not made. Moreover, JDWP access to local variables is achieved by the "GetValues" and "SetValues" commands, which allow accessing a set of variables with a single message. In FIG. 2d, it is assumed that the JDWP server 120 is configured to be in the "can_access_live_variables" state but not in the "can_access_local_variables" state, which is a feature of the subject matter described herein. When JDWP client 110 sends a JDWP message 221 to access a set of live variables, then JDWP server 120 must successfully provide the values from (or set the values in) JVM 131, returning a confirmation message 222. When JDWP client 110 sends a JDWP message 223 to access a set of variables containing a dead variable, then the JDWP server 120 may return an error message 224 (e.g., INVALID_SLOT) instead of returning (or setting) the dead variables at JVM 131. Nevertheless, the JDWP server 120 may still return the dead variables (e.g., if the JVMTI server 130 was able to provide the dead variables as described above in the case of JVMTI). To always obtain the maximum available information from the JDWP server 120 and to avoid an error indication, the JDWP client 110 may send a "GetLiveVariables" or "SetLiveVariables" message 225. Then, the JDWP server 120 must at least provide (from, or set, the values in the JVM 131) all the values of those variables requested which are live and provide confirmation with message 226.

Although FIGS. 2a-2d depict specific messages, the messages (e.g., commands, replies, error messages, and the like) associated with JVMTI and JDWP include a variety of other messages as well.

The JVMTI client 121 includes an "Agent_OnLoad" procedure. The Agent_OnLoad procedure must be called by JVM 131 and/or JVMTI server 130 on startup (i.e., on-load) when loading the JVMTI client library. The Agent_OnLoad procedure enables JVMTI client 121 to configure the desired features of the JVMTI server 130. At startup, the JDWP server 120 (if implemented as a JVMTI client 121) may request can_access_live_variables but not can_access_local_variables from the JVMTI server 130. When this is the case, the JVMTI server 130 does not have to restrict the dynamic compiler of JVM 131 with regard to the dead variables. When the JDWP server 120 (and/or JVMTI client 121) requests both, can_access_live_variables state and can_access_local_variables state, but only obtains can_access_live_variables confirmation, then JDWP server 120 may still startup properly. This is because JDWP server 120 is allowed to merely grant access to live variables at the JVM 131 to the JDWP client 110. When JDWP server 120 (as well as JVMTI client 121) does not obtain at least the can_access_live_variables confirmation 208 at startup, then JDWP server 120 (and with it JVMTI server 130 and JVM 131) may choose to terminate with an error since JDWP server 120 (and JVMTI server 130)

cannot satisfy JDWP client 110 requests for the minimum useful subset of variables, namely live variables.

Table 4 below includes a sample implementation of the Agent_OnLoad procedure (in the form of pseudo-code in Scheme syntax) of a JDWP server making use of JVMTI services described above.

```
;;The terms "JDWP2" and "JVMTI2" refer to modifications (consistent
;; with the features of the subject matter described herein) over prior
;; JDWP protocols and prior JVMTI protocols.
(define (Agent_OnLoad JDWP2-RQMTS)
    ;; REQUIRES: 'JDWP2-RQMTS' holds the user's requirements on the
    ;; JDWP2 debugging features.
    ;; CHANGES: Possibly changes the state of the JVM such as to be
    ;;    able to support the requirements from 'JDWP2-RQMTS'.
    ;; RETURNS: A valid JVMTI2 state or an error.
(cond
  ((user-requires-standard-jdwp? JDWP2-RQMTS)
    ;; E.g. the user may have supplied a standard JDWP option
    ;; '-agentlib:jdwp=...' or some non-standard JDWP2 option
    ;; '-agentlib:jdwp=locals=all...' indicating that standard
    ;; JDWP behavior is desired.
    (let ( (jvmti2-state
        (make-jvmti2-state
           ;; request standard JVMTI capabilities from the
           ;; JVMTI2 server.
            can-access-local-variables
            can-pop-frame
           ;; ... more needed standard JVMTI capabilities
        )) )
      (if (null? jvmti2-state)
         ;; ... then the JVMTI2 server did not grant the
         ;; needed capabilities. For instance because the JVM
         ;; only implements a subset of these. User's
         ;; requirements can not be satisfied.
         (make-jdwp2-error
            JDWP2-RQMTS "Standard JDWP is not supported")
         ;; ... else the JVMTI2 server granted the needed
         ;; capabilities. The JVM's dynamic compiler will
         ;; generate machine code that supports all the
         ;; debugging functionality. Return JVMTI2 state.
         jvmti2-state)))
  (;; ... else
    (user-requires-low-impact-jdwp? JDWP2-RQMTS)
    ;; E.g. the user may have supplied a non-standard
    ;; '-agentlib:jdwp=locals=live...' option. This will not
    ;; be accepted by standard JDWP implementations.
    (let ( (jvmti2-state
        (make-jvmti2-state
           ;; request JVMTI capabilities from the JVMTI server.
            can-access-live-variables
           ;; ... more needed standard JVMTI capabilities but
           ;; possibly not 'can-pop-frame', which would require
           ;; keeping arguments live.
        )) )
      (if (null? jvmti2-state)
         ;; ... then the JVMTI2 server did not grant the
         ;; needed capabilities. For instance because the JVM
         ;; does not implement access even to live variables.
         ;; User's requirements can not be satisfied.
         (make-jdwp2-error
            JDWP2-RQMTS "Low impact JDWP is not supported")
         ;; ... else the JVMTI2 server granted the needed
         ;; capabilities. The JVM's dynamic compiler will
         ;; generate machine code that needs only support the
         ;; low impact debugging functionality of JDWP2.
         ;; Return JVMTI2 state.
         jvmti2-state)))
  (;; ... else
    #t
    ;; No debugging is required by the client.
    ;; Return indication of success.
    #t)))
```

The JDWP server 120 may refuse to deliver or manipulate values of dead variables when it has only obtained (as a JVMTI client 121) the can_access_live_variables confirmation 208, without having obtained the can_access_local_va-riables confirmation 214. In this state, JDWP server 120 may still choose to deliver or manipulate dead variables if the dead variables reside within frames of interpreted rather than compiled methods.

Table 5 lists pseudo-code demonstrating how JDWP server 120 may interact with JDWP client 110. For simplicity, it is assumed that the incoming requests only access a single variable, although access to a set of variables may be implemented as well.

```
;; The terms "JDWP2" and "JVMTI2" refer to modifications (consistent
;;with the features of the subject matter described herein) over prior
;;JDWP protocols and prior JVMTI protocols.
(define (serve-jdwp2-request JDWP2-REQ JVMTI2-STATE)
   ;; REQUIRES: 'JDWP2-REQ' is a JDWP2 request sent by a JDWP2
   ;;   client. 'JVMTI2-STATE' is the state of the underlying
   ;;   JVMTI2 server as prepared by the procedure
   ;;   'Agent_OnLoad'.
   ;; CHANGES: Possibly changes the state of a thread via the
   ;;   JDWP2 command contained in 'JDWP2-REQ'.
   ;; RETURNS: A valid JDWP2 reply or an error.
(cond
  ((is-get-local-variable? JDWP2-REQ)
    ;; Standard JDWP request.
    (cond
      ((can-access-local-variables? JVMTI2-STATE)
        (send-variable-value JDWP2-REQ))
      (;; ... else
        (can-access-live-variables? JVMTI2-STATE)
        ;; Non-standard JDWP condition. This can not happen in
        ;; prior JDWP implementations.
        (if (reads-live-variable? JDWP2-REQ)
            ;; ... then provide its value
            (send-variable-value JDWP2-REQ)
            ;; ... else provide an error
            (send-jdwp2-error JDWP2-REQ invalid-slot)))
      (;; ... else
        #t
        ;; May succeed on a per-request basis,
        ;; but here we choose to send an error.
        (send-jdwp2-error JDWP2-REQ not-implemented))))
  (;; ... else
    (is-set-local-variable? JDWP2-REQ)
    ;; Standard JDWP request.
    (cond
      ((can-access-local-variables? JVMTI2-STATE)
        (set-variable-value JDWP2-REQ))
      (;; ... else
        (can-access-live-variables? JVMTI2-STATE)
        ;; Non-standard JDWP condition. This can not happen in
        ;; prior JDWP implementations.
        (if (writes-live-variable? JDWP2-REQ)
            ;; ... then set its value
            (set-variable-value JDWP2-REQ)
            ;; ... else provide an error
            (send-jdwp-error JDWP2-REQ invalid-slot)))
      (#t
        ;; May succeed on a per-request basis,
        ;; but here we choose to send an error.
        (send-jdwp2-error JDWP2-REQ not-implemented))))
  (;; ... else
    (is-pop-frame? JDWP2-REQ)
    ;; Standard JDWP request.
    (cond
      ((can-pop-frame? JVMTI2-STATE)
        (pop-frame JDWP2-REQ))
      (;; ... else
        #t
        ;; Non-standard JDWP condition. This can not happen
        ;; in prior JDWP implementations. This may succeed
        ;; on a per-request basis but here we choose to send
        ;; an error.
        (send-jdwp2-error JDWP2-REQ not-implemented))))
  (;; ... else
    #t
    ;; Other standard JDWP requests.
    (serve-other-requests JDWP2-REQ JVMTI2-STATE))))
```

In some implementations, system 100 may be interoperable with a command line debugger known as "jdb" (commercially available from Sun Microsystems, Inc.). The jdb debugger is a prior JDWP client. Table 6 depicts a sample session protocol of how jdb handles the behavior of the JDWP of FIG. 1 when a dead variable is accessed. The debugged program rests at a breakpoint in the jdb_break_here procedure and the calling procedure check_live_among_dead_locals is compiled.

```
main[2] up
main[2] list
27  static int check_live_among_dead_locals(int i0)
28  int i1dead = 1+i0;
29  int i2live = 2+i0;
30  int i3dead = 3+i0;
31  => boolean blive = jdb_break_here( );
32  // all locals are dead here except 'i2live' and 'blive'.
33  return blive ? i2live-2/*success*/
    : i2live-1/*failure*/;
34
35
36  public static void main(String[ ] args)
main[2] print i1dead
com.sun.jdi.InternalException: Unexpected JDWP Error: 35
i1dead = null
main[2] print i2live
i2live = 3
main[2] locals
Internal exception:
com.sun.jdi.InternalException: Unexpected JDWP Error: 35
```

Referring to Table 6, the value of the live variable i2live may be read properly. Attempting to read the value of the dead variable i1dead yields the error code 35, which corresponds to INVALID_SLOT. The "locals" command of jdb tries to access all the variables of the frame at once via a single JDWP command GetValues. Since among the variables there are dead ones, this will lead to an error 35 and no variable will be obtained at all. An improved jdb client might avoid this error condition by using "GetLiveValues" instead of "GetValues."

Figure 3:
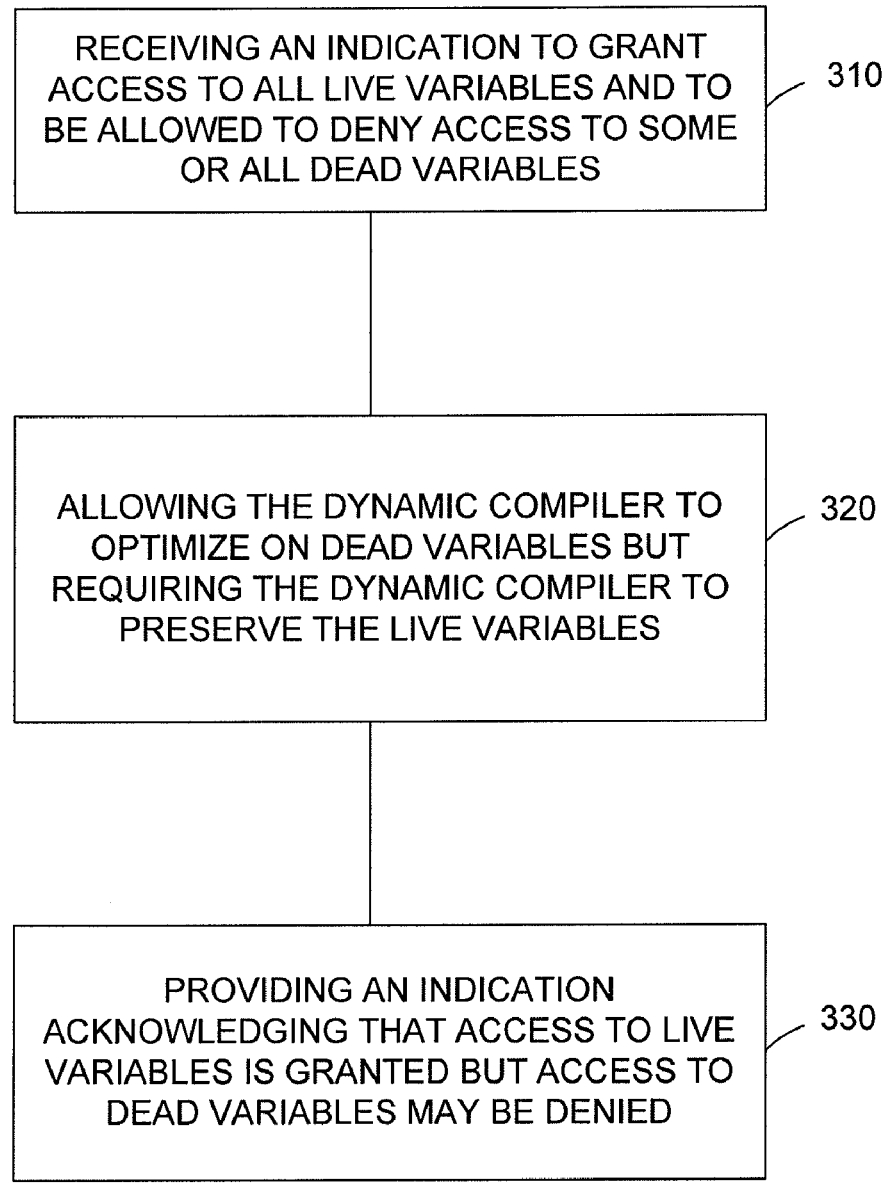
FIG. 3 is a method for dynamic compilation of programs in a virtual machine (e.g., JVM) to enable compilation to be optimized without regard to dead variables.

FIG. 3 depicts a method 300 for dynamic compilation of programs in a virtual machine (e.g., JVM 131) by enabling compilation to be optimized without regard to dead variables. Referring to FIG. 3, at 310, an indication may be received by the virtual machine. The indication may represent that the client (e.g., the JVMTI client and/or a JDWP client) demands access to live variables of an application (which may undergo dynamic compilation at JVM 131) while the client does not require access to dead variables. At 320, the virtual machine may, based on the indication 310, enable the dynamic compiler to compile without regard to the dead variables. For example, a dynamic compiler of JVM 131 may compile the application without preserving the dead variables. In some cases, such a compilation without regard to the dead variables may enable JVM 131 to be compiled and/or executed in an enhanced (i.e., optimized) way, when compared to approaches that do use the dead variables. At 330, an indication may be provided from the virtual machine to the client (e.g. JVMTI client 121 and thus JDWP server 120) acknowledging that access to all live variables is granted, but that access to some or all dead variables may be denied. For example, at 330, JVMTI client 121 (and thus JDWP server 120) may receive the indication 208 provided by JVMTI server 130 acknowledging that access to all live variables is granted, but that access to some or all dead variables may be denied.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed:

1. A non-transitory computer-readable medium containing instructions to configure at least one processor to perform a method, the method comprising:
   receiving a first indication to grant, to a debug client, access to a set of variables and to allow access to be inhibited to a set of remaining variables, wherein the set of granted variables comprises a set of live variables and the set of remaining variables comprises a set of dead variables, the set of granted variables comprising a subset of variables accessible at a dynamic compiler;
   allowing the dynamic compiler to optimize the set of remaining of variables, while the set of granted variables is preserved; and
   providing, to a debug client, a second indication acknowledging access to the set of granted variables and allowing access to be inhibited to the set of remaining variables.

2. The non-transitory computer-readable medium of claim 1, wherein receiving further comprises:
   receiving the first indication as a can_access_live_variables message without the can_access_local_variables message being received; and implementing the first indication using one or more messages.

3. The non-transitory computer-readable medium of claim 1 further comprising:
   inhibiting by providing an error message representing that the set dead of variables is not available.

4. The non-transitory computer-readable medium of claim 3, wherein inhibiting further comprises:
   inhibiting by compiling a program at a Java virtual machine (JVM) without preserving the set of dead variables, the set of dead variables including one or more dead variables.

5. The non-transitory computer-readable medium of claim 1 further comprising:
   receiving, from a Java virtual machine tools interface (JVMTI) client, the first indication at a JVMTI server.

6. The non-transitory computer-readable medium of claim 1 further comprising:
   receiving, at a client, a response to a request, the response sent from a server, the response including an error message representing denial of access to the set of dead variables, the client comprising at least one of a Java debug wire protocol (JDWP) client or a JVMTI client, and the server comprising at least a JDWP server or a JVMTI server.

7. The non-transitory computer-readable medium of claim 1 further comprising:
   configuring, at startup, whether to operate a virtual machine to allow the dynamic compiler to operate in a state allowing access to live variables or allowing access to local variables, the local variables including live and dead variables.

8. The non-transitory computer-readable medium of claim 1, wherein allowing further comprises:
   allowing the dynamic compiler to optimize on the set of dead variables.

9. A computer-implemented method comprising:
   receiving a first indication to grant, to a debug client, access to a set of variables and to allow access to be inhibited to a set of remaining variables, wherein the set of granted variables comprises a set of live variables and the set of remaining variables comprises a set of dead variables, the set of granted variables comprising a subset of variables accessible at a dynamic compiler;
   allowing the dynamic compiler to optimize the set of remaining of variables, while the set of granted variables is preserved; and
   providing, to a debug client, a second indication acknowledging access to the set of granted variables and allowing access to be inhibited to the set of remaining variables.

10. The computer-implemented method of claim 9, wherein receiving further comprises:
    receiving the first indication as a can_access_live_variables message without the can_access_local_variables message being received.

11. The computer-implemented method of claim 9 further comprising:
    inhibiting by providing an error message representing that the set of dead variables is not available.

12. The computer-implemented method of claim 11, wherein inhibiting further comprises:
    inhibiting by compiling a program at a Java virtual machine (JVM) without preserving the set of dead variables, the set of dead variables including one or more dead variables.

13. The computer-implemented method of claim 9 further comprising:
    receiving, from a Java virtual machine tools interface (JVMTI) client, the first indication at a JVMTI server.

14. The computer-implemented method of claim 9 further comprising:
    receiving, at a client, a response to a request, the response sent from a server, the response including an error message representing denial of access to the set of dead variables, the client comprising at least one of a Java debug wire protocol (JDWP) client or a JVMTI client, and the server comprising at least a JDWP server or a JVMTI server.

15. The computer-implemented method of claim 9 further comprising:
    configuring, at startup, whether to operate a virtual machine to allow the dynamic compiler to operate in a state allowing access to live variables or allowing access to local variables, the local variables including live and dead variables.

16. The computer-implemented method of claim 9, wherein allowing further comprises:
    allowing the dynamic compiler to optimize on the set of dead variables.

17. A system comprising:
    at least one processor;
    at least one memory, wherein the at least one processor and the at least one memory are configured to perform a method comprising:
    receiving a first indication to grant, to a debug client, access to a set of variables and to allow access to be inhibited to a set of remaining variables, wherein the set of granted variables comprises a set of live variables and the set of remaining variables comprises a set of dead variables, the set of granted variables comprising a subset of variables accessible at a dynamic compiler;
    allowing the dynamic compiler to optimize the set of remaining of variables, while the set of granted variables is preserved; and
    providing, to a debug client, a second indication acknowledging access to the set of granted variables and allowing access to be inhibited to the set of remaining variables.

* * * * *